United States Patent
Travez et al.

(10) Patent No.: US 8,302,515 B2
(45) Date of Patent: Nov. 6, 2012

(54) SUPPORT ELEMENT FOR STRENGTHENING CONNECTION BETWEEN A TOOL AND ITS HOLDER

(75) Inventors: Joe V. Travez, Falls Church, VA (US); Jose M. Travez, Fredrick, MD (US); Italo Travez, Ashburn, VA (US)

(73) Assignee: Prototype Productions, Inc., Ashburn, VA (US)

( * ) Notice: Subject to any disclaimer, the term of this patent is extended or adjusted under 35 U.S.C. 154(b) by 1373 days.

(21) Appl. No.: 11/269,583

(22) Filed: Nov. 9, 2005

(65) Prior Publication Data

US 2007/0101839 A1    May 10, 2007

(51) Int. Cl.
*B23B 29/12* (2006.01)
(52) U.S. Cl. .................. 82/158; 408/239 R; 407/102
(58) Field of Classification Search ............. 408/226, 408/233, 238, 239 R; 407/77, 99, 101, 102; 82/148, 158; *B23B 29/12*
See application file for complete search history.

(56) References Cited

U.S. PATENT DOCUMENTS

| | | | |
|---|---|---|---|
| 2,931,254 A * | 4/1960 | Briney, Jr. et al. ............ 408/151 |
| 3,760,662 A | 9/1973 | Brock | |
| 4,507,027 A * | 3/1985 | Adamson et al. ............. 408/197 |
| 4,514,117 A * | 4/1985 | Scott .......................... 408/239 R |
| 4,616,738 A * | 10/1986 | Shurtliff ........................ 188/380 |
| 4,896,892 A * | 1/1990 | Andrews ....................... 279/46.5 |
| 4,958,966 A * | 9/1990 | Andrews .................... 408/239 A |
| 5,080,536 A | 1/1992 | Andrews | |
| 6,808,340 B2 | 10/2004 | Travez et al. | |
| 7,293,942 B2 * | 11/2007 | Travez et al. ............. 408/239 R |
| 2002/0035902 A1 * | 3/2002 | Ericksson et al. .............. 82/158 |

OTHER PUBLICATIONS

International Search Report (Form PTO/ISA/210) and Written Opinion of the International Search Authority (From PCT/ISA/237) from Corresponding PCT application.

* cited by examiner

*Primary Examiner* — Boyer D Ashley
*Assistant Examiner* — Sara Addisu
(74) *Attorney, Agent, or Firm* — Patton Boggs LLP (57) ABSTRACT

A support element is attachable to a tool receivable in a tool holder bore so as to strengthen a connection between the tool and a tool holder and provide increased rigidity and vibration damping. The support element has a first support element end adapted for disposition adjacent to a forwardly facing mounting surface of the tool holder and a second support element end adapted for disposition adjacent to a forward end of the tool. The support element is mountable on the tool so as to be disposed completely between the forwardly facing mounting surface and the forward end of the tool. In one configuration, the support element includes a base having an underside configured for abutment with the tool holder and an extension protruding in a longitudinal direction from the base. The base is adapted to receive at least one element operable to produce adjustable canting of the base with respect to the tool holder and corresponding adjustable frictional engagement between the support element and the tool.

11 Claims, 11 Drawing Sheets

SUPPORT ELEMENT FOR STRENGTHENING CONNECTION BETWEEN A TOOL AND ITS HOLDER

BACKGROUND OF THE INVENTION

1. Field of the Invention

Machine tools, such as turning centers and lathes, utilize tool holders in order to hold a variety of different tools such as boring bars. The present invention concerns a support element which can be used to strengthen a connection between a tool and a tool holder and provide that connection with increased rigidity.

2. Description of Related Art

Commonly assigned U.S. Pat. No. 6,808,340 B2 to Travez et al. relates to various cutting tool apparatus configurations having shanks and tool support extensions disposed longitudinally adjacent the shanks. The various configurations disclosed provide tool and tool holder assemblies with interconnections having improved rigidities. The entire disclosure of U.S. Pat. No. 6,808,340 B2 is incorporated herein by reference as non-essential material.

SUMMARY OF THE INVENTION

It is one object of the invention to provide a simple and inexpensive alternative to the various configurations disclosed by the patent identified above which strengthens and increases the rigidity of the tool and tool holder connection. According to the invention, therefore, a support element, attachable to a tool receivable in a tool holder bore, produces a connection between the tool and a tool holder which is strengthened and which provides increased rigidity and vibration damping. The support element includes a first support element end, adapted for disposition adjacent to a forwardly facing mounting surface of the tool holder, and a second support element end, adapted for disposition adjacent to a forward end of the tool. The support element is mountable on the tool so as to be disposed completely between the forwardly facing mounting surface and the forward end of the tool.

In one embodiment of the invention, the first support element end is defined by an underside of a base configured for abutment with the tool holder, the second support element end is defined by an end of an extension protruding in a longitudinal direction from the base, and the base is adapted to receive at least one element operable to produce adjustable canting of the base with respect to the tool holder. The extension, or the base and the extension together, may define a groove extending in the longitudinal direction, and the groove may include a projection defined therein which is receivable in a longitudinally extending recess defined in the tool. In this embodiment, adjustable frictional engagement occurs at least between surfaces of the projection and the recess, and the element operable to produce adjustable canting is a set screw.

According to an alternative embodiment, the groove may be defined by an interior wall surface having overhanging wall portions adapted to partially enclose areas of a tool outer surface. In this case, the adjustable frictional engagement occurs at least between the tool outer surface and the overhanging wall portions.

The extension may include a recessed portion including bores adapted to receive set screws therein.

In another embodiment, the first and second support element ends are defined by collars secured to the tool, and the support element is at least partly defined by a spring provided between the collars and adapted to engage a circumferential outer surface of the tool.

The support element may be configured as a hollow cylinder. A portion of the cylindrical wall may be absent so as to provide a clearance adapted to facilitate insertion of the tool into the support element.

The invention additionally concerns a process of providing a connection between a tool and a tool holder with increased rigidity. This process includes the acts or operations of introducing the tool into a longitudinally extending groove defined in a support element, disposing an underside of the support element adjacent the tool holder, and adjustably canting the support element with respect to the tool holder. Frictional engagement between the support element and the tool can be adjusted in this way.

BRIEF DESCRIPTION OF THE DRAWINGS

The description set out below refers to the embodiments shown in the drawing figures for the purposes of explanation only and without intending to limit in any way the scope of protection defined by the claims.

DETAILED DESCRIPTION OF THE INVENTION

The present invention is not limited in its application to the details of any particular arrangement described or shown, since the present invention may take the form of any of various embodiments without departing from the spirit and scope of the present invention. The principles of this invention are described by referring to several embodiments for simplicity and illustrative purposes. Although only several embodiments of the invention are particularly disclosed herein, one of ordinary skill in the art would readily recognize that the same principles are equally applicable to, and can be implemented in, all types of tooling. Furthermore, numerous specific details are set forth below and in the drawing figures to convey with reasonable clarity possession of the present invention, descriptions of how to make and/or use the present invention, and the best mode in carrying out the present invention known at the time of this invention. The present invention, however, may be practiced without limitation to these specific details. In other instances, well known methods and structures have not been described in detail so as not to unnecessarily obscure the present invention. Finally, the terminology used herein is for the purpose of description and not limitation. Thus, the following description is not to be taken in a limiting sense and the scope of the invention is defined by the claims and equivalents thereto.

The phrase "tool apparatus" is intended to refer to tooling assemblies, tool holders, tool bars, cutting tool inserts, and the like. The phrase tool holder means any device or article for holding another tool apparatus and is synonymous with tool bushing, collet, collar, sleeve, and the like. Finally, the embodiments described below share common features and characteristics that need not be discussed repeatedly for appropriate understanding.

Figure 1:
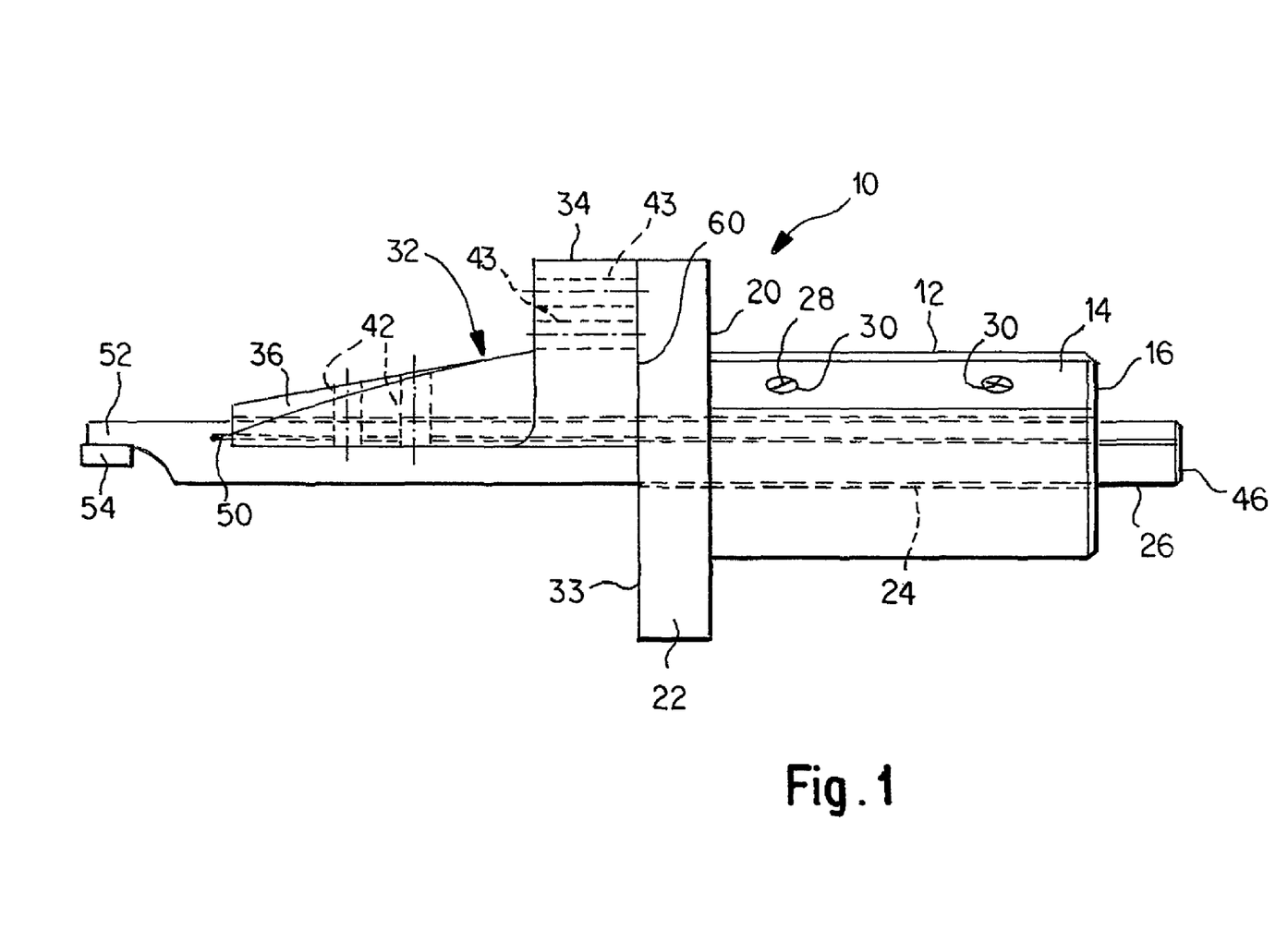
FIG. 1 is a side view of support element according to the invention mounted in an in-use position on a tool and tool holder.

FIG. 1 illustrates a tool holder 10 composed of a shank 12 that is generally cylindrical in shape and that has one or more longitudinal flats 14 for a setscrew fastening arrangement with the chuck (not shown) of a tool apparatus or machine tool such as a drill press or lathe. The shank may also have a coolant inlet (not shown), if necessary. The shank 12 extends longitudinally forward from a rearwardly disposed mounting end 16, and terminates at a rearwardly facing mounting surface or shoulder 20 defined by a forward flange 22 which may be integrally formed with or otherwise rigidly attached to the shank. The mounting shoulder 20 serves in a conventional manner to properly locate the tool holder 10 in the machine tool chuck. A central bore 24, drilled or otherwise machined or formed in the shank 12 and the flange 22, is adapted to receive a drilling, boring, or cutting tool 26, such as a boring bar, when the tool holder 10 is in use. Set screws 28, provided in bores 30 disposed along one or more of the flats 14, are used to retain the cutting tool in place within the central bore 24.

The invention is, of course, appropriate for use with types of tools other than those particularly mentioned above, such as reamers, end mills, and so on.

Figure 3:
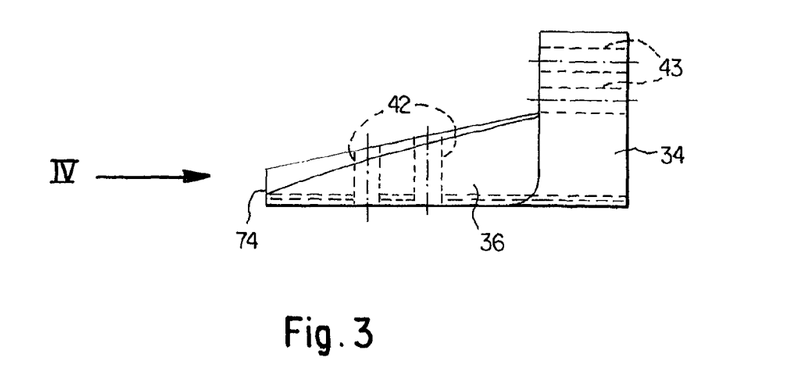
FIG. 3 is a slightly enlarged side view of the support element shown in FIG. 1.

A tool support element 32 according to a first embodiment of the invention has a first end 60 which is adapted to be located adjacent to a forwardly facing mounting surface or shoulder 33 of the forward flange 22. Referring to FIGS. 1 and 3, the tool support element 32 includes a base 34 and an extension 36 formed integrally with the base 34. The extension 36, as illustrated, has a cross section which roughly approximates part of the frustum of a truncated cone. It will be apparent, however, that the extension 36 may have alternative (e.g. alternatively tapered, curved or non-tapered) configurations.

Figure 2:
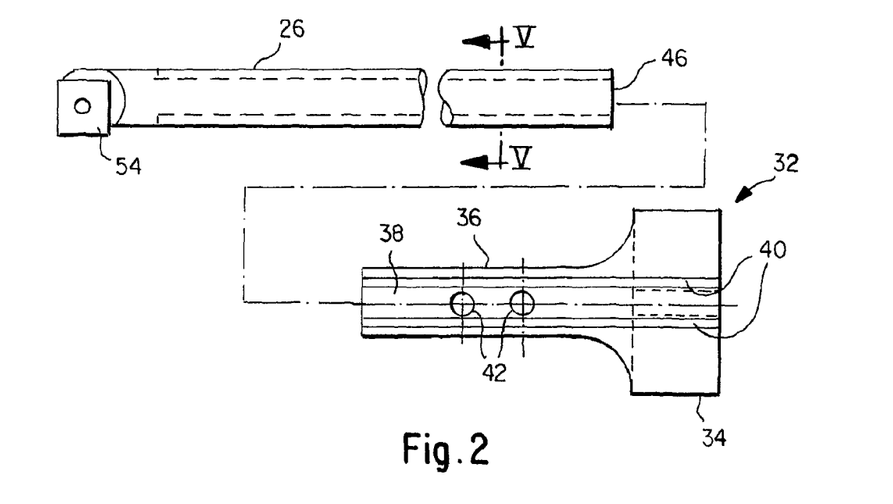
FIG. 2 is a view showing the manner in which the support element of the invention receives the tool upon which it acts.
Figure 4:
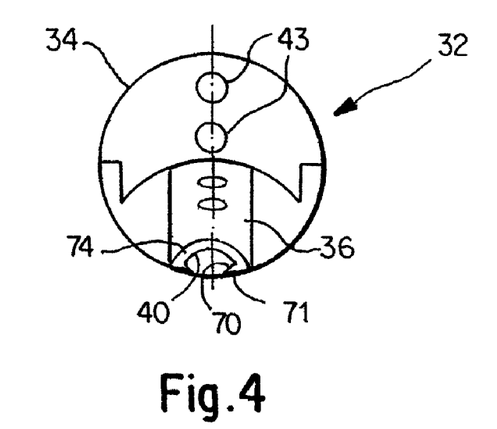
FIG. 4 is a view of the support element illustrated in FIG. 3 as seen in the direction of arrow IV.

The tool support element 32 is provided with a longitudinally extending groove or recess 38 which is designed and dimensioned so as to partially surround the outer circumference of the tool 26. Dovetail tongues 40, best seen in FIGS. 2 and 4, are provided in the groove 38. The extension 36 and the base 34 are respectively provided with threaded bores 42 and 43 adapted to receive set screws when the element 32 is in use. It should be readily apparent that a single threaded bore 42 and a single threaded bore 43, or more than the two threaded bores 42 and more than the two threaded bores 43, rather than the two threaded bores illustrated, could be utilized for set screw reception.

Figure 5:
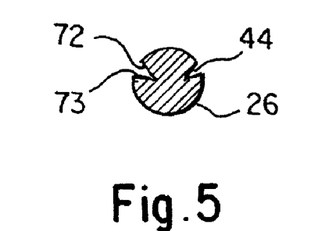
FIG. 5 is a sectional view of a tool appropriate for use together with the support element of the first embodiment.

In the first embodiment, the drilling or cutting tool 26 is provided with longitudinally extending dovetail notches or grooves 44 configured and dimensioned so as to receive the dovetail tongues 40. The grooves 44 preferably extend from a rear end 46 of the tool, and at least one of the grooves preferably has a termination point 50 proximate a front or forward end 52 of the tool 26 at which a cutting insert 54 is mounted.

Although dovetail notches or grooves and tongues are mentioned above, it is to be understood that other appropriate interlocking features, such as splines, keyways, and so on, may be used.

The tool 26 can be mounted to the chuck of a machine tool for drilling, boring, cutting, or a similar operation, for example, by introducing the rear end 46 of the tool 26 into the longitudinally extending groove 38 of the tool support element 32 in the direction of the arrow IV of FIG. 3. Introduction of the tool 26 into the groove 38 necessitates aligning the dovetail tongues 40 with the dovetail grooves 44. As the tool 26 is introduced into the groove 38, the tongues 40 slide within the grooves 44. Relative movement of the support element 32 and the tool 26 is limited in one direction in this embodiment by the termination point or termination points 50.

Once the tool support element 32 is located at a desired position along the tool 26, the element 32 may be retained in position on the tool by producing frictional engagement of set screws, received in the bores 42, with the circumferential outer surface of the tool. The rear end 46 of the tool may then be introduced into the central bore 24 of the tool holder 10, and the tool 26, with the tool support element 32 mounted thereon, can be displaced with respect to the tool holder 10 until a first end of the support element, here defined by an underside 60 of the tool support element base 34, abuts the forwardly facing mounting shoulder 33 of the flange 22. A second end 74 of the support element is at this point disposed adjacent the forward end 52 of the tool 26, and the support element 32 as a whole is disposed completely between the forwardly facing mounting surface 33 and the forward end 52. After securing the tool 26 within the bore 24 using set screws 28, the further set screws received in bores 43 can then be operated so as to cause ends thereof to project beyond the underside 60 of the base 34 and into engagement with the mounting shoulder 33. As the set screws progressively protrude from the bores 43, engagement of the set screws with the shoulder 33 causes tilting or canting of the tool support element 32 with respect to both the tool holder 10 and the tool 26, causing the tool support element 32 to act as a wedge. This tilting or canting, in turn, produces frictional engagement between outer surfaces of the dovetail tongues 40 and the dovetail grooves 44; in the illustrated configuration, tongue surfaces 70 will frictionally engage groove surfaces 72 at locations near the base underside 60, while tongue surfaces 71 will frictionally engage groove surfaces 73 at locations near the second or forward end 74 of the tool support element extension 36. Further adjustment of the set screws disposed in bores 42 and 43 can be used to produce an increasingly (or decreasingly) rigid combination of the tool holder 10, the tool support element 32, and the tool 26, with the element 32 essentially forming a frictionally anchored beam supporting the tool 26. The shank 12 of the tool holder, tool support element, and tool combination can then be mounted in conventional fashion to the machine tool chuck.

Other mounting procedures will be readily apparent to those of ordinary skill in the art.

Figure 6:
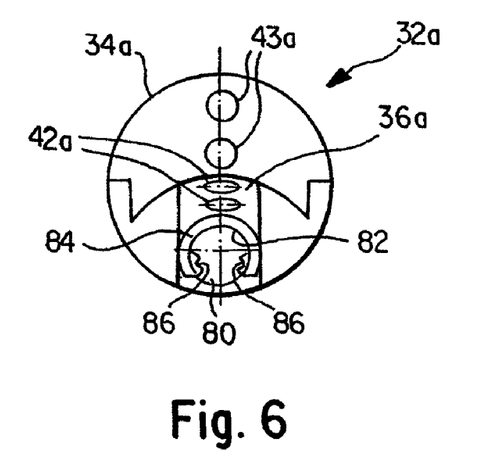
FIG. 6 is a view similar to FIG. 4 but showing a second embodiment of a support element according to the invention.

FIG. 6 illustrates a second embodiment of a tool support element according to the invention. Elements and features of the second embodiment which are essentially the same as corresponding elements of the first embodiment are not described in detail; these elements and features are designated with reference numbers which are similar to those used in connection with the first embodiment but with the letter "a" added thereto.

Figure 7:
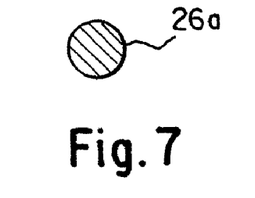
FIG. 7 is a sectional view of a tool appropriate for use together with the support element shown in FIG. 6.
Figure 8:
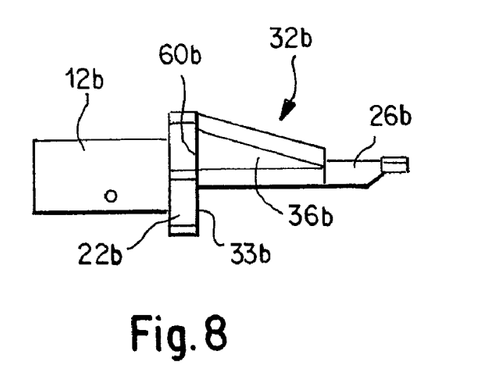
FIGS. 8-11, respectively, are side, top, front, and bottom views of a third embodiment of the invention.
Figure 9:
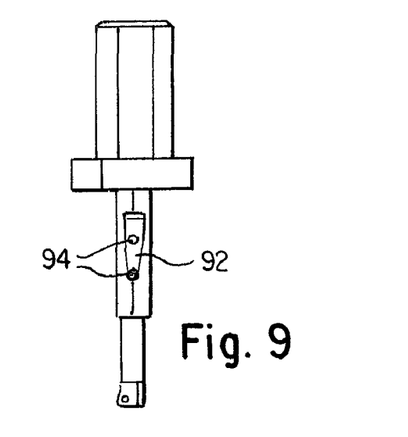

The tool support element 32a of the second embodiment is useable with a tool 26a shown in the cross sectional view of FIG. 7. The tool support element 32a and the tool 26a do not have interlocking features, although the tool 26a is not precluded from having notches, grooves, or other such features. The base 34a of the tool support element includes a hole or bore 80 into which the tool 26a can be inserted. An extension 36a has a groove or recess therein defining an interior wall surface 82 dimensioned to closely fit around a portion of the outer circumference of the tool 26a, and projects from the base 34a in a manner similar to that in which the extension 36 of the first embodiment projects from the base 34.

As shown in FIG. 6, the interior surface 82 of the wall 84 has a circumferential extent of over 180 degrees. Overhanging wall surface portions 86 consequently overlie, i.e. partially enclose or envelop, areas of the tool outer surface or circumference when the tool 26a is received for use in the hole or bore 80. Provision of the overhanging wall surface portions 86, of course, is not critical, as the tilting or canting to be described will occur in both the presence and the absence of these surface portions.

Set screws received in bores 43a can be operated so as to cause ends thereof to project beyond the underside of the base 34a and into engagement with a mounting shoulder of a tool holder in a manner similar to the first embodiment. As the set screws progressively protrude from the bores 43a, tilting or canting of the tool support element 32a with respect to both the tool holder and the tool 26a increases. This tilting or canting, in turn, produces frictional engagement of the tool outer surface with the interior surfaces of the overhanging wall portions 86 as well as with the interior surface of the hole or bore 80. Further adjustment of the set screws disposed in bores 42a and 43a can be used to produce an essentially rigid combination of the tool holder, the tool support element, and the tool in a manner analogous to that of the first embodiment, with the element 32a essentially forming a frictionally anchored beam supporting the tool 26a. Again, a single bore 42a and a single bore 43a, or more than the two bores 42a and the two bores 43a, can be used. As another alternative, a screw or bolt rather than a set screw may be received in each of the bores 43a. A corresponding threaded bore in the forwardly facing mounting surface of the forward flange may receive an end of the screw or bolt such that the base 34a is pulled toward and tightened against rather than pushed away from the mounting surface. The shank of the tool holder, tool support element, and tool combination can then be mounted to a machine tool chuck as in the first embodiment.

Figure 10:
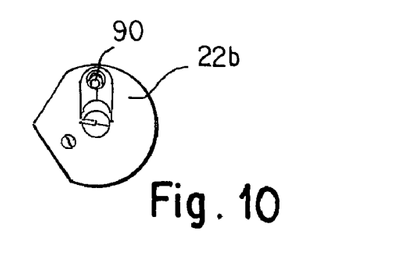
Figure 11:
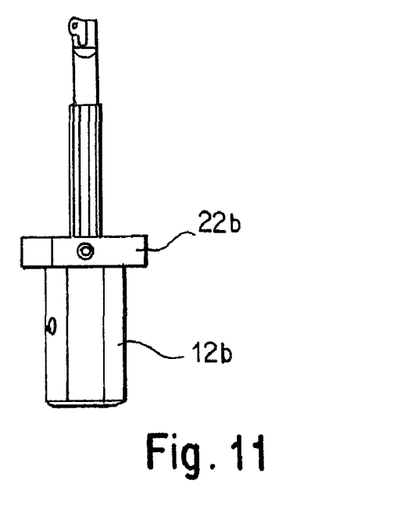
Figures 12, 14, 15:
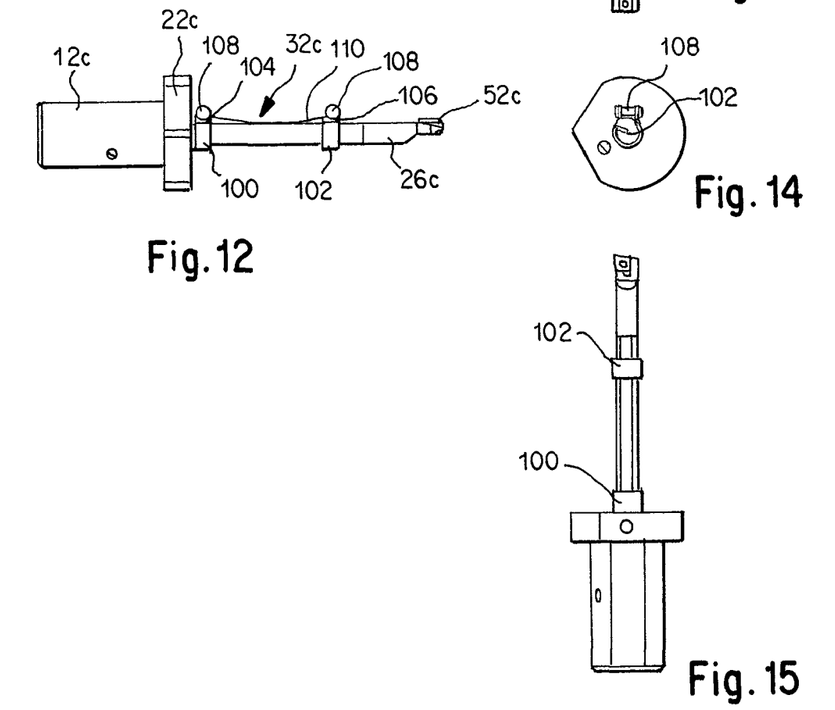
FIGS. 12-15, respectively, are side, top, front, and bottom views of a fourth embodiment of the invention.
Figure 13:
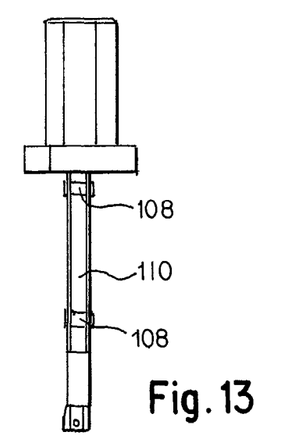
Figure 16:
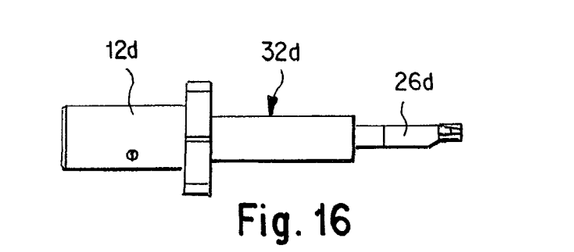
FIGS. 16-19, respectively, are side, top, front, and bottom views of a fifth embodiment of the invention.
Figure 17:
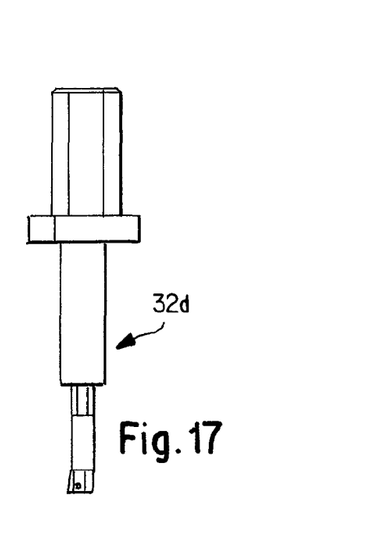
Figure 18:
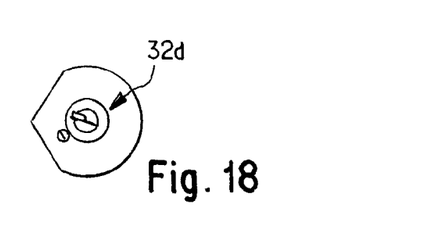
Figure 19:
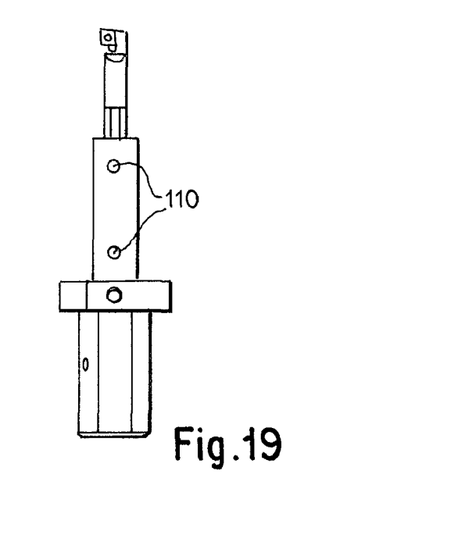
Figure 20:
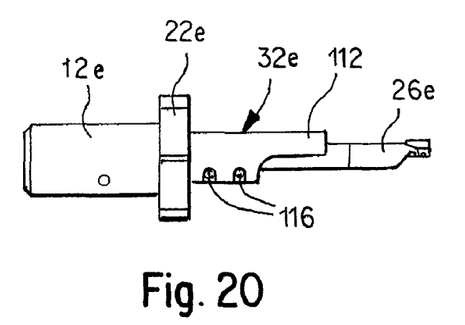
FIGS. 20-23, respectively, are side, top, front, and bottom views of a sixth embodiment of the invention.
Figure 21:
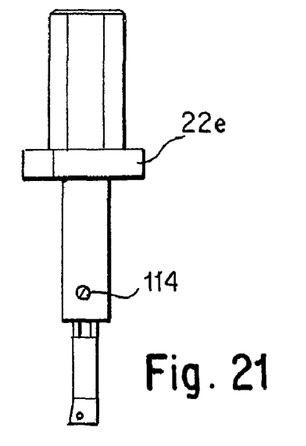
Figure 22:
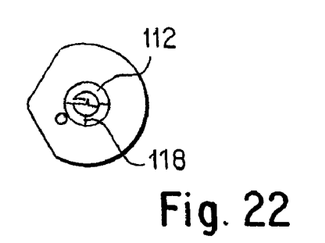
Figure 23:
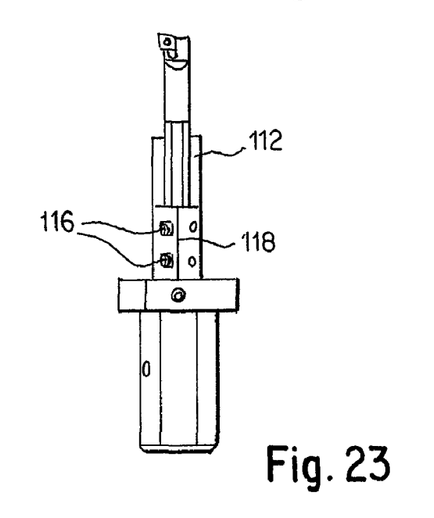
Figure 24:
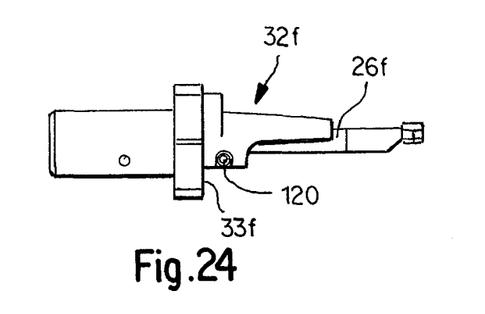
FIGS. 24-27, respectively, are side, top, front, and bottom views of a seventh embodiment of the invention.
Figure 25:
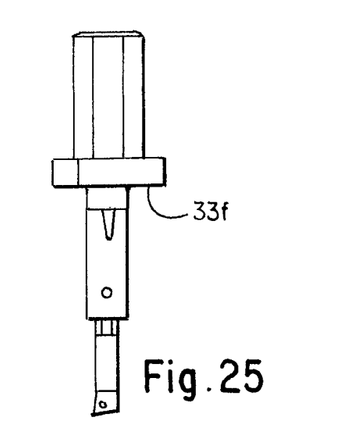
Figure 26:
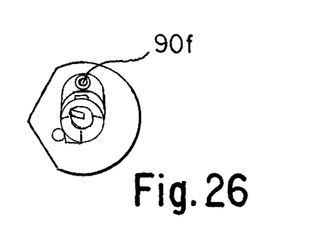
Figure 27:
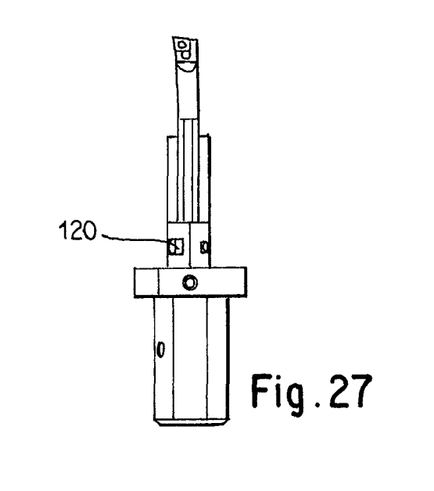
Figure 28:
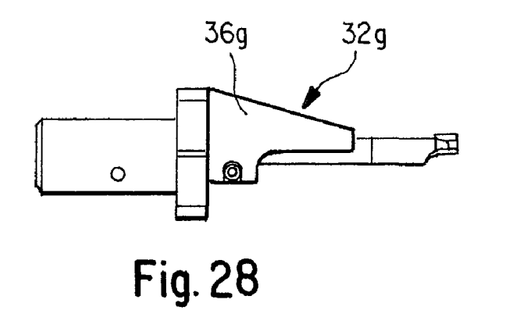
FIGS. 28-31, respectively, are side, top, front, and bottom views of an eighth embodiment of the invention.
Figure 29:
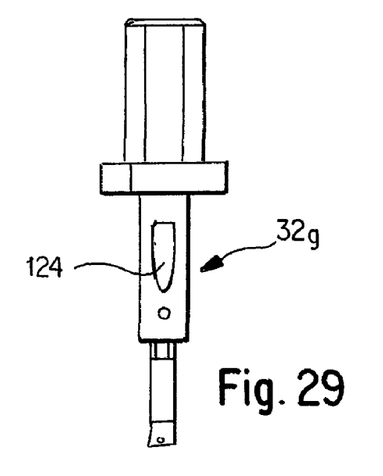
Figure 30:
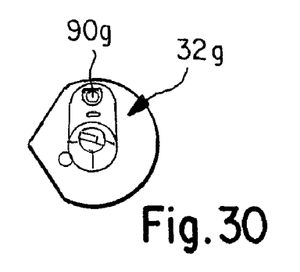
Figure 31:
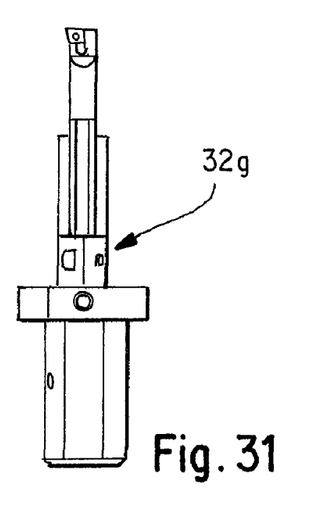
Figure 32:
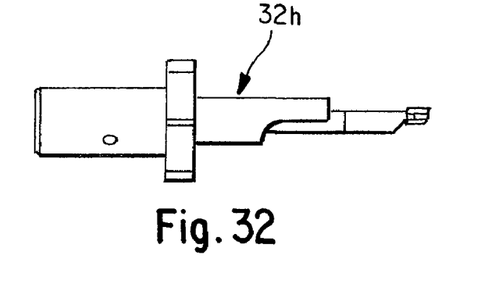
FIGS. 32-35, respectively, are side, top, front, and bottom views of a ninth embodiment of the invention.
Figure 33:
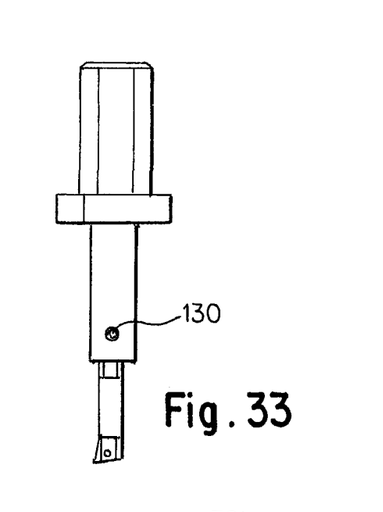
Figure 34:
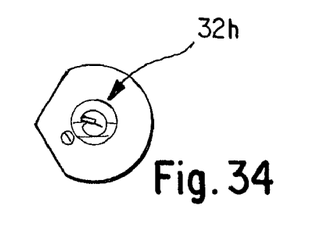
Figure 35:
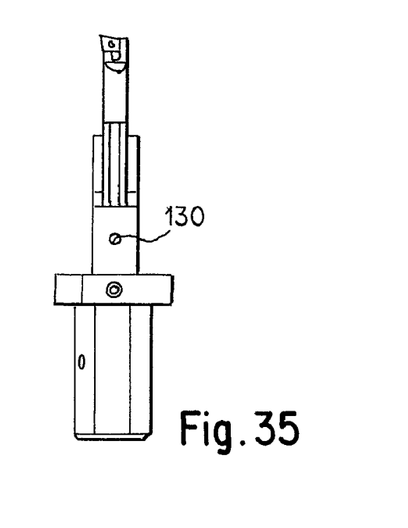
Figure 36:
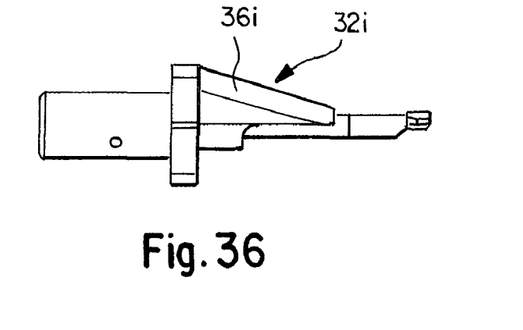
FIGS. 36-39, respectively, are side, top, front, and bottom views of a tenth embodiment of the invention.
Figure 37:
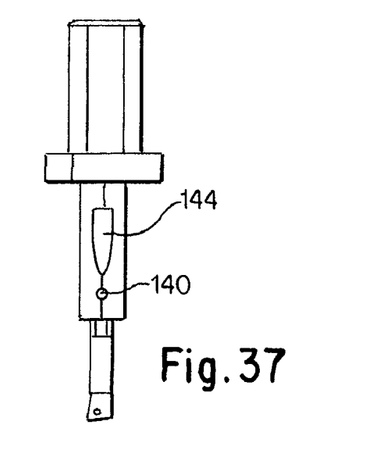
Figure 38:
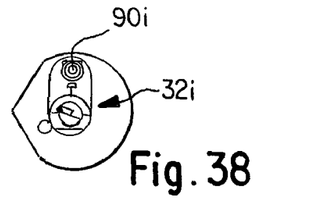
Figure 39:
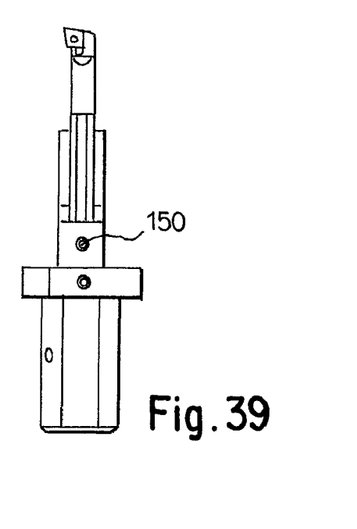

Various other configurations of the invention which are designed to add rigidity to and damp vibrations of a drilling or cutting tool are also contemplated. FIGS. 8-11 show a third embodiment of the invention, with certain elements and features which are essentially the same as previously described elements and features and which are therefore designated with reference numbers which are similar to those used previously but with the letter "b" added thereto. These figures illustrate a drilling or cutting tool 26b mounted to a shank 12b, with a tool support element 32b secured to the tool. As seen in FIG. 10, a set screw 90, operating in a manner similar to the set screws received in bores 43 of the first embodiment, is also provided. As an alternative, the element 90 may be configured as a bolt or stud receivable in a threaded bore extending from a mounting surface or shoulder 33b into the forward flange 22b, which again may be integrally formed with or otherwise rigidly attached to the shank 12b in a manner similar to the flange 22 of the structure shown in FIG. 1. The extension 36b of the element 32b is provided with a recessed or flattened portion 92, in which threaded bores adapted to receive set screws 94 are provided. The set screws 94 are operable to engage against the circumferential outer surface of the tool 26b. The set screws 90 and 94, or the set screws 94 and the bolt or stud 90, together cooperate to retain the tool support element 32b in position on the tool 26b and preferably against the surface or shoulder 33b. The tool support element 32b, in this way, can be used to provide the drilling or cutting tool with added rigidity and increased vibration damping.

FIGS. 12-15 show a fourth embodiment of the invention, with elements and features which are essentially the same as previously described elements and features and which are therefore designated with reference numbers which are similar to those used previously but with the letter "c" added thereto. These figures illustrate a drilling or cutting tool 26c mounted to a shank 12c, with a tool support element 32c secured to the tool 26c only. The tool support element, as shown, is displaced from the forward flange 22c, and in this embodiment is not secured thereto. The tool support element 32c of this embodiment includes a first band or collar 100, defining a first support element end, located adjacent the forward flange 22c and a second band or collar 102, defining a second support element end, located closer to the front or forward end 52c of the tool 26c than the first band. The collar 100 has a pair of ends defined by upstanding flanges 104, while the collar 102 has a pair of ends defined by upstanding flanges 106. Fasteners, formed by bolts, rivets, snaps, or the like, identified by reference number 108, are used to fasten the flanges 104 to each other and the flanges 106 to each other. The collars 100 and 102, in this way, are frictionally secured in position on the tool 26c. A preload leaf spring 110 has ends 112 mounted around or otherwise secured to the fasteners, and bows inwardly and presses against the circumferential outer surface of the tool 26c, thereby serving to wedge against the circumferential outer surface so as to assist in absorbing vibrations. The pressure of the preload spring on the circumferential outer surface of the tool 26c may be adjusted to some extent by changing the distance between the collars 100 and 102 axially with respect to the tool 26c.

FIGS. 16-19 show a fifth embodiment of the invention, with certain elements and features which are essentially the same as previously described elements and features and which are therefore designated with reference numbers which are similar to those used previously but with the letter "d" added thereto. These figures illustrate a drilling or cutting tool 26d mounted to a shank 12d, with a tool support element 32d secured to the tool. The tool support element 32d according to this embodiment is configured as a hollow cylinder or tube having a central bore within which the tool 26d can be received. Set screws 110 in threaded bores provided in the wall of the tool support element 32d may be used to retain the support element in axial position on the tool 26d.

FIGS. 20-23 show a sixth embodiment of the invention, with certain elements and features which are essentially the same as previously described elements and features and which are therefore designated with reference numbers which are similar to those used previously but with the letter "e" added thereto. These figures show a drilling or cutting tool 26e mounted to a shank 12e, with a tool support element 32e. The tool support element 32e according to this embodiment has a portion of the cylindrical wall thereof absent or removed so as to define an approximately semicircular extension 112.

This feature provides an opening or clearance which facilitates insertion of the tool 26e into the tool support element. A set screw 114 is located near an end of the element 32e, or more precisely an end of the extension 112, distal the forward flange 22e. This set screw 114 creates a wedge effect, preventing the element 32e from axial movement along the tool 26e, and assists in securing the tool support element 32e in proper longitudinal position on the tool 26e. The element 32e further includes bolts, screws, or other adjustable fasteners 116 oriented approximately tangentially with respect to the cylindrical wall thereof. The fasteners 116 are located proximate the forward flange 22e. The wall of the hollow cylindrical element forming the tool 26e is discontinuous, defining a gap 118. Adjustment of the fasteners 116, therefore, permits increasing or decreasing circumferential frictional engagement between the tool support element interior wall and the circumferential outer surface of the drilling or cutting tool 26e.

FIGS. 24-27 show a seventh embodiment which is essentially the same as the sixth embodiment, except that only one adjustable fastener 120 is arranged approximately tangentially with respect to the cylindrical wall, and a set screw, bolt, or stud 90f, operating in the same manner as the set screw, bolt, or stud 90 of the third embodiment, is provided. To help retain the tool support element 32f adjacent the mounting surface or shoulder 33f, the fastener 120 permits circumferential expansion and contraction of the portion of the tool support element to be located adjacent the forward flange so as to provide adjustable frictional engagement between the tool support element and the outer circumferential surface of the tool 26f. The eighth embodiment shown in FIGS. 28-31 is essentially the same as the seventh embodiment, except that the extension 36g of the element 32g includes more material, for greater stiffness and strength, and a channel or flat 124 formed in the extension 36g to facilitate mounting of the bolt, stud, or set screw 90g.

FIGS. 32-35 illustrate a ninth embodiment of the invention which is similar in many respects to the fifth embodiment shown in FIGS. 16-19. In the ninth embodiment, however, the tool support element 32h has a portion of the cylindrical wall thereof absent or removed, similar to the element 32e of the sixth embodiment, and the set screws 130 are provided on diametrically opposite and longitudinally displaced locations.

FIGS. 36-39 show a tenth embodiment of the invention which is similar in many respects to the ninth embodiment shown in FIGS. 32-35 and which includes a first set screw 140 engageable with the outer circumference of the drilling, boring, or cutting tool and a second set screw 150 also engageable with the outer circumference of the drilling, boring, or cutting tool at a location which is axially displaced and approximately diametrically opposed to the location of the first set screw 140. In the tenth embodiment, in a manner similar to the eighth embodiment shown in FIGS. 28-31, the extension 36i of the tool support element 32i may include more material, for greater stiffness and strength. A channel or flattened portion 144 is optionally formed in the extension 36i to facilitate mounting of bolt, stud, or set screw 90i which, of course, is also optional.

While the present invention has been described in terms of several embodiments, it is apparent that other forms could be adopted by one skilled in the art. It is anticipated that the teachings of the present invention encompass any reasonable substitutions or equivalents of claim limitations. The tool support element according to the invention may be machined, molded, or otherwise produced from any appropriate metal, metal alloy, or plastic material, and the structure, sizes and shapes of individual components can vary. Those skilled in the art will appreciate that other applications, including those outside of the machining industry, are possible with this invention. Accordingly, the present invention is not limited to only cylindrical boring or machining in general, and the scope of the invention is to be limited only by the following claims.

The invention claimed is:

1. A tool support element attachable to a tool that is mounted in a tool holder that is inserted into a bore in a machine tool, to provide increased rigidity and vibration damping of a shaft of the tool when operational in the machine tool, where the tool holder has a substantially flat face forming a plane which is perpendicular to the axis of the tool, which flat face is forwardly facing opposite the face of the machine tool when the tool holder is fully inserted into the machine tool, including a tool fastening apparatus formed in the tool holder for engaging the tool, the tool support element comprising:

a channel for receiving and retaining a tool which extends outwardly from the flat face of the tool holder;

a tool clamping apparatus for securing the tool in the channel of the tool support element; and a tool support adjustable canting apparatus operable to extend through the tool support element to contact the flat face of the tool holder and to cause controllable tilting of the tool support element with respect to at least one of the tool and the flat face of the tool holder.

2. The tool support element according to claim 1 wherein the tool support adjustable canting apparatus comprises:

a threaded screw operable to cause an end thereof into engagement with the flat face of the tool holder to cause tilting of the tool support element with respect to the flat face of the tool holder.

3. The tool support element according to claim 1 wherein the tool support adjustable canting apparatus comprises:

a threaded screw formed to extend into said channel to engage a circumferential outer surface of the tool to cause tilting of the tool with respect to the tool support element.

4. The tool support element according to claim 1 wherein the cross-section of the tool support roughly approximates part of the frustum of a truncated cone.

5. The tool support element according to claim 1 wherein the channel has formed therein a projection which mates with a longitudinally extending recess defined in the tool.

6. The tool support element according to claim 5 wherein the tilting of the tool support element produces frictional engagement between the projection in the channel and the mating recess defined in the tool.

7. The tool support element according to claim 1 wherein the tool has formed therein a projection which mates with a longitudinally extending recess defined in the channel.

8. The tool support element according to claim 7 wherein the tilting of the tool support element produces frictional engagement between the projection in the tool and the mating recess defined in the channel.

9. The tool support element according to claim 1 wherein the clamping apparatus comprises:

at least one set screw disposed in the channel to retain the tool in position in the channel by producing frictional engagement of the at least one set screw with the circumferential outer surface of the tool.

10. The tool support element according to claim 1, further comprising:

wherein the channel is a hollow cylinder in shape, extending over 180 degrees; and wherein the clamping apparatus comprises at least one set screw disposed in the channel to retain the tool in position in the channel by producing frictional engagement of the tool with the interior walls of the channel.

11. The tool support element according to claim 1, further comprising:

wherein the channel is a hollow cylinder in shape, having a gap in the walls thereof; and wherein the clamping apparatus comprises at least one set screw to close the gap in the walls of the channel to retain the tool in position in the channel by producing frictional engagement of the tool with the interior walls of the channel.

\* \* \* \* \*